Dec. 23, 1958 A. G. SPORER 2,865,676
SPRAY NOZZLE FOR USE IN BEDDING GLASS PLATES
FOR GRINDING AND POLISHING
Filed Aug. 9, 1954
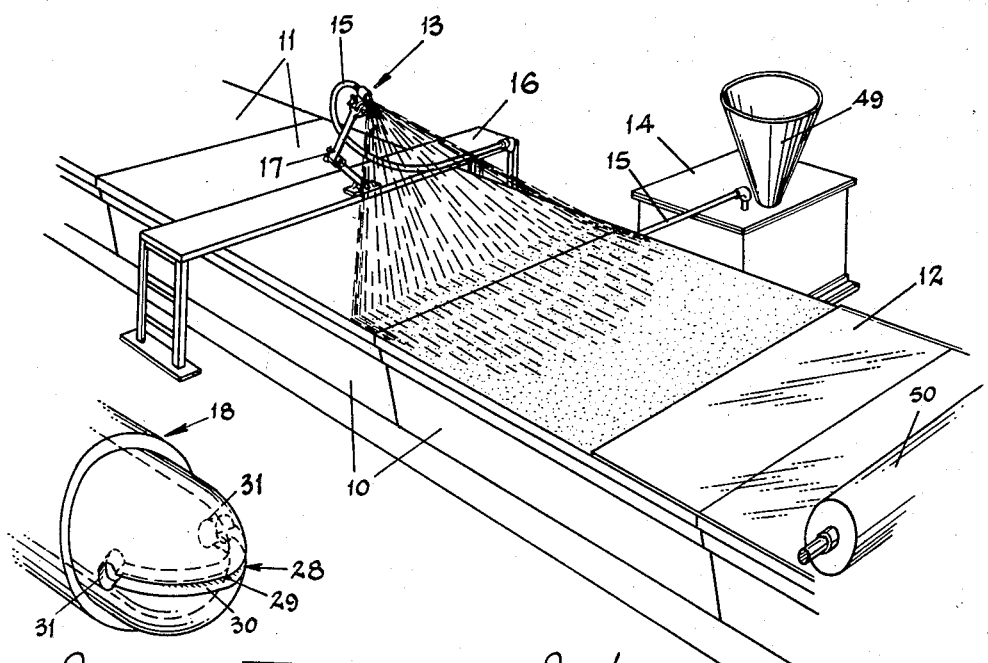
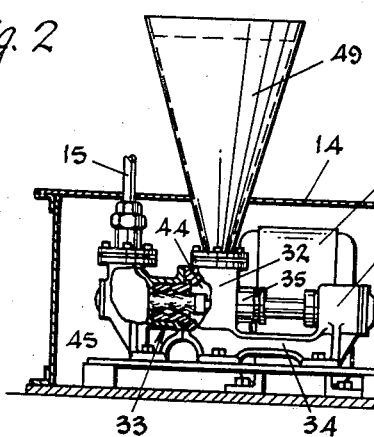
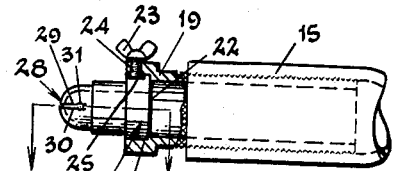
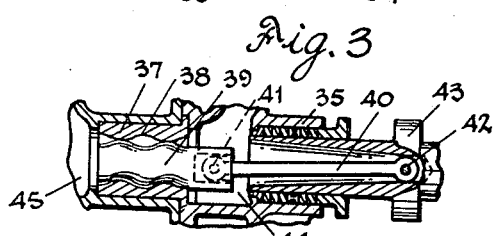
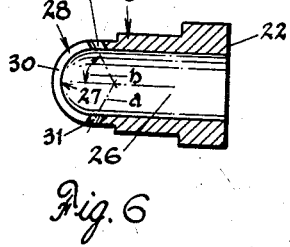
Inventor
Anthony G. Sporer
Nobbe & Swope
Attorneys

United States Patent Office 2,865,676
Patented Dec. 23, 1958

2,865,676

SPRAY NOZZLE FOR USE IN BEDDING GLASS PLATES FOR GRINDING AND POLISHING

Anthony G. Sporer, Ottawa, Ill., assignor to Libbey-Owens-Ford Glass Company, Toledo, Ohio, a corporation of Ohio Application August 9, 1954, Serial No. 448,515

2 Claims. (Cl. 299—153)

The present invention relates broadly to the surfacing of glass sheets or plates. More particularly, it has to do with the application of a layer of plaster, upon which the glass blanks to be surfaced can be bedded, to glass supporting tables.

Briefly stated, the invention involves a novel and improved apparatus, including a special spray nozzle, or nozzles, and constant flow pump for applying a smooth, level layer of plaster on glass supporting tables by continuously spraying a mixture of plaster and water in a spray pattern calculated to cover the entire surface of the glass supporting tables.

While not restricted to such use, the apparatus of the invention has proved to be of outstanding value when employed in the so-called continuous method of grinding and polishing plate glass blanks. According to this method, as now quite widely practiced, a plurality of rough glass blanks are mounted upon a series of cars or tables arranged in end to end relation and movable continuously in a definite, substantially horizontal path to carry the glass blanks first beneath and in engagement with a series of grinding units and then beneath and in engagement with a series of polishing units.

The glass blanks are laid end to end upon the cars or tables in slightly spaced relation, and are usually secured to the tops of the tables by being bedded in a layer of plaster of Paris that has previously been applied to the table tops by slushing a mixture of plaster and water thereover from a bucket. The glass blanks are laid upon the layer of wet plaster and then pressed downwardly therein, usually by a rolling pressure applied to the upper surfaces of the blanks, or by tamping.

As indicated above, heretofore the most commonly used method of applying plaster to the tops of the glass supporting tables was by slushing a mixture or, rather, a suspension, of plaster in water, from a pail, over an area of sufficient size to accommodate one glass blank. The difficulty with this procedure is, first, that as the pail of plaster is being carried from the mixer to the tables the plaster will begin to settle in the water, so that a uniform suspension is not maintained and, second, it is practically impossible for a man to throw a water suspension of plaster from a pail in a manner to spread it into a layer of uniform thickness over a large area which, in regular commercial practice is normally upwards of six feet square.

Consequently, in the area covered by plaster that has been slushed from a pail, there will be an outer band of the plaster layer that is relatively thin and consists of a watery mixture of the finer plaster grains; the main area of the plaster layer will be a somewhat thicker or heavier and denser mixture containing a preponderance of plaster particles of medium size; while the area of the plaster layer lying just below the position where the operator held the pail during the slushing operation will contain the dregs from the pail including the larger size plaster particles which have settled to the bottom.

Moreover, the supporting tables most commonly used do not have side walls, and the side edges thereof generally have a small degree of downward deflection, due to the weight of the glass plates. For this reason, it is desirable that a heavier concentration of the plaster suspension be applied along the side edges of the tables to provide an edge coating having a top surface that is level with the top surface of the coating on the central portion of the glass supporting table and, as pointed out above, the bucket method of applying plaster inherently produces a thin watery outer band.

Consequently, the commonly used method of slushing the plaster suspension from a pail not only fails to give a uniform layer of plaster of equal thickness on the central portion of the glass supporting table, but it also makes it extremely difficult, if not impossible, to get the necessary extra thickness of bedding material along the supporting table side edges.

Now the quality of the finish on ground and polished plate glass (i. e., freedom from waves and distortion) as well as the amount of breakage during the grinding and polishing operations is largely dependent upon the proper laying of the glass blanks upon the work tables. The method of applying plaster to the tables as just described has been in general use for a long period, and it has also been suggested that the plaster be applied by a spray gun held in the hand of an operator and in which the plaster and water are mixed at or in the spray nozzle.

However, neither of these methods have been found to be entirely satisfactory in providing a layer of plaster in which the glass blanks can be bedded in the strain-free, level manner required to grind and polish the surfaces thereof to meet rigid, present day requirements for commercially acceptable plate glass.

This is primarily because the formerly used or suggested methods of plaster application fail to spread the plaster mix upon the tops of the tables in the carefully controlled thickness necessary to provide a truly level and even supporting bed for the glass blanks, with the result that, when the blanks are pressed downwardly into the plaster, strains are set up in the glass that cause breakage under the weight of the grinding and polishing tools. Moreover, when these strained glass blanks are released from the plaster after grinding and polishing of the upper surface, they will spring back to their normal position, thus forming waves or distortion in the glass. In addition, these formerly used methods were both labor and time consuming.

It is the primary aim of the present invention to provide a new apparatus for spraying plaster onto glass supporting tables in a manner to form a level coating of plaster having a uniform concentration of plaster particles, and a uniform distribution of particle sizes throughout the entire area of the plaster layer.

Another object is the provision of a fixed position spray nozzle mounted above a series of grinding and polishing tables and emitting a fan-like spray of a suspension of plaster above the tables passing therebeneath.

A further object of the invention is the provision of a spray nozzle that will throw a wide fan-like pattern of spray having a uniform volume of flow for a given segment inwardly from the side edges of the fan, and a relatively greater volume of flow along the side edges of the fan.

A still further object of the invention is to provide, in apparatus of the above character, a special type of pump which provides a continuous flow of the plaster suspension at a positive pressure to the nozzle.

Other objects and advantages of the invention will become more apparent during the course of the following description when taken in connection with the accompanying drawings.

In the drawings, wherein like numerals are employed to designate like parts throughout the same:

Figure 1 is a fragmentary, perspective view of a part of a continuous glass grinding and polishing line, showing the spray apparatus of the invention in operative position;

Figure 2 is a perspective view of the nozzle;

Figure 3 is a section through the pump;

Figure 4 is a detail view of a portion of the pump;

Figure 5 is a side elevation of the nozzle with the connection therefore partially in section; and Figure 6 is a section taken substantially along line 6—6 of Figure 5.

Referring now more particularly to the drawings, there is shown in Figure 1 the laying yard of a continuous grinding and polishing system. The system includes a plurality of tables 10, provided with flat, horizontal top surfaces 11 and secured together, end to end, for movement as a unit along a definite horizontal path. To this end, the tables are mounted on grooves or tracks (not shown) along which they are moved, preferably by a pusher mechanism (also not shown).

Glass blanks 12 to be surfaced are laid in plaster on the tops 11 of the tables 10 at the laying yard or station shown in Figure 1 and are carried on the tables from the laying yard to the surfacing area where they are conveyed successively under a series of grinding and then under a series of polishing units. From the surfacing area the sheets are carried to a stripping yard where they are removed from the tables and then returned to the laying yard where they are relaid with the ground and polished surface down to allow the second surface to be finished. The laying of the glass on the tables and its removal therefrom is usually done by means of suitable suction frames hung from a traveling crane.

As explained above, it is customary to secure the glass blanks 12 to be ground and polished to the tops of the tables 10 by bedding them in plaster. According to this invention, a layer of plaster or other suitable material, that sets up upon the addition of a liquid, is applied to the tops 11 of the tables 10 by spraying thereover a suspension of the material from a nozzle 13 which is fed from a pump assembly 14 through a hose 15.

As illustrated, a single spray having a fan-like pattern which distributes a suspension of plaster, or other bedding material, uniformly over the central portion of the glass supporting table and in heavier concentrations along the side edges thereof, is ejected from a fixed position above the tables as they pass therebeneath. Although a fixed position nozzle is shown, it may be movable, for example along a line parallel to the length of the tables 10 to provide, or accelerate, the relative movement between the spray nozzles and tables.

In the preferred form of the invention, the special spray nozzle 13 is mounted for universal adjustment on a suitable support 16 by means of a hinged and jointed bracket 17. As shown, the support 16 may be in the form of a bridge across the line of tables, and the nozzle 13 is positioned above the longitudinal center line of the tables.

The particular form of nozzle herein disclosed is best illustrated in Figures 5 and 6 and is made up of a spray head 18 carried by a cylindrical body portion 19. More specifically, the body portion 19 is provided with a concentric passage 20 extending throughout and terminating at one end in an enlarged annular portion 21 adapted to receive the flanged entry end 22 of the spray head 18. A wing-nut 23 is carried in a threaded hole 24 provided at the exit end of the body portion 19 adjacent the annular portion 21 and serves to contact a flat surface 25 provided on the entry end 22 of the spray head 18, thereby holding the spray head in lockable engagement with the body portion.

The spray head 18 is provided with a concentric passageway 26 running from the entry end 22 of the head and terminating at the discharge end thereof in a hemispherical surface 27 having a spray slot 28, defined by spaced parallel side surfaces 29 and 30 of constant and equal width formed therein and communicating with the atmosphere.

As seen in Figures 2 and 6, the spray slot 28 proper is of constant cross section intermediate its ends and describes an arc of somewhat less than 180 degrees. Each of the end edges of the surfaces 29 and 30, defining the slot, terminates in a forwardly directed hole 31 of a larger diameter than the distance between said surfaces and having its center line $a$ disposed at an angle $b$, preferably 60°, to the center line $c$ of the spray head. Since the diameter of the holes 31 is greater than the distance between the surfaces 29 and 30, the cross sectional area of the hole will be larger as compared to the cross sectional area of the slot intermediate the holes and, therefore, will conduct a greater volume of fluid for a given increment along the periphery of the slot.

It has been found that a nozzle of the type described above will create a fan-like spray of bedding material having a uniform rate of deposition across the portion of the supporting table inwardly from the side edges thereof, and at the same time provide a relatively greater amount of material along the side edges.

To connect the nozzle 13 to the hose 15 the body portion 19 of the nozzle is provided with an external knurl on the outer surface thereof adapted to engage the inner wall of the hose 15 thereby providing a non-leaking connection therebetween.

Various types of pumps may be used for pumping the plaster suspension into the hose 15 but best results are obtained when the suspension is fed in a continuous flow at a positive pressure from a self-cleaning type pump. A special kind of pump assembly which has given exceptionally good results is shown in detail in Figure 3.

This special pump assembly preferably includes a suitable pump casing 32 within which the pump per se, designated in its entirety by the numeral 33, is enclosed. The pump 33 comprises a base 34 carrying the pump body or housing 35 adjacent one end, and suitable bearings 36 aligned with the housing. Fixedly mounted within the pump body is a stator 37 having a double internal helical thread 38, and mounted to revolve within the stator 37 is a rotor 39 which is in the form of a true helical screw. The rotor 39 is adapted to be revolved within the stator by means of a connecting rod 40 having universal joints 41 and 42 at either end.

The joint 41 is coupled in the end of the rotor 39, while the joint 42 is located within and connected to a hollow-ended drive shaft 43 journaled in the pump body and the bearings 36. By reason of the double universal joint connection of the rod 40, the rotor 39 revolves about its axis while, and at the same time, contact of said rotor with the inner surface of the stator 37 produces an eccentric action between rotation of the drive shaft 43 and revolution of the rotor and causing said rotor axis to travel in the circular path of an established radius. Since every section of the rotor's helical contour is offset this radial distance from the said axis, the total rotor travel will amount to the eccentric formation, or internal helical thread 38, of the stator. In other words, with each complete revolution, the rotor is adapted to contact the entire surface of the stator thereby producing open areas, spiraling lenghwise across the stator, in which the plaster mix, without pulsation, is impelled from the inlet port 44 to the outlet port 45 of the pump body 35.

The outer end of the drive shaft 43 is provided with a pulley 46 that is driven through the belt 47 by a motor 48. As shown in Figure 1, the pump 33 and motor 48 are contained within the assembly indicated at 14 to insure protection of the parts of the apparatus from accumulations of plaster, water or ambient dust.

With this type of pump, pumping action starts as soon as the rotor begins to revolve and the single rotating element exerts a positive pumping action comparable to that of a piston moving through a cylinder of infinite length. The continuous pushing action in one direction provides uniform discharge without pulsation or lost motion. Solids, such as plaster, in suspension are very satisfactorily handled, and the pump is practically self-cleaning.

As explained above, various materials may be used to bed the glass blanks onto the tables but we have obtained excellent results with plaster of Paris, of such particle size that 85% will pass through a 100 mesh screen, mixed with water in the ratio of 100 parts plaster to 180 parts water. These ingredients are mixed in a suitable mixture and then poured or otherwise introduced into a hopper 49 secured to the pump housing 35 and arranged to discharge into the inlet side thereof from the bottom of the hopper. Alternatively, a discharge pipe from an automatic plaster mixer can be connected to the pump housing to permit the mixture or suspension to be pumped direct from a mixer.

Upon operation of the pump, the suspension of plaster fed thereto will be pumped through the hose 15 to the nozzle 13 in a continuous flow under positive pressure. In this way, a spray of plaster and water will be discharged above the moving tables to fall in a level surfaced coating across the entire width of the table. By laying the blanks onto this layer and forcing them into the plaster as they pass beneath a level mounted laying roll 50, or in any other suitable manner, these blanks will be bedded onto the tables 10 in a level and strain-free manner.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for applying a suspension of bedding material to the surface of grinding and polishing tables, a spray nozzle having a body portion, and a spray head attached to said body portion and having an arcuate slot formed therein, said slot being of substantially constant cross-sectional area and defined by two continuous spaced surfaces each of which having its end edges terminating at an enlarged aperture having its center line displaced at an approximate angle of 60° from the center line of said spray head.

2. In apparatus for applying a suspension of bedding material to the surface of grinding and polishing tables, a spray nozzle including a body portion having a passageway formed therein, and a spray head removably attached to said body portion and having a concentric passageway formed therein and communicating with the passageway in said body portion, said concentric passageway terminating at the one end of the spray head in a hemispherical surface having a slot formed therein of constant cross-sectional area, said slot being defined by two parallel spaced uninterrupted surfaces of equal and constant width each of which having its end edges terminating at a circular aperture of a diameter larger than the distance between said surfaces and having its center line displaced at an approximate angle of 60° from the center line of the concentric passageway formed in the spray head.

References Cited in the file of this patent

UNITED STATES PATENTS

| | | |
|---|---|---|
| 862,315 | Dolan | Aug. 6, 1907 |
| 1,001,526 | Jaenisch | Aug. 22, 1911 |
| 1,194,520 | Lewis | Aug. 15, 1916 |
| 1,261,494 | Delacroix | Apr. 2, 1918 |
| 1,297,374 | Lutz | Mar. 18, 1919 |
| 2,339,158 | Drake | Jan. 11, 1944 |

FOREIGN PATENTS

| | | |
|---|---|---|
| 126,471 | Great Britain | of 1919 |
| 707,369 | France | July 7, 1931 |
| 572,854 | Great Britain | Oct. 26, 1945 |